R. G. HOLMES.
Churn.
No. 28,177.
Patented May 8, 1860.
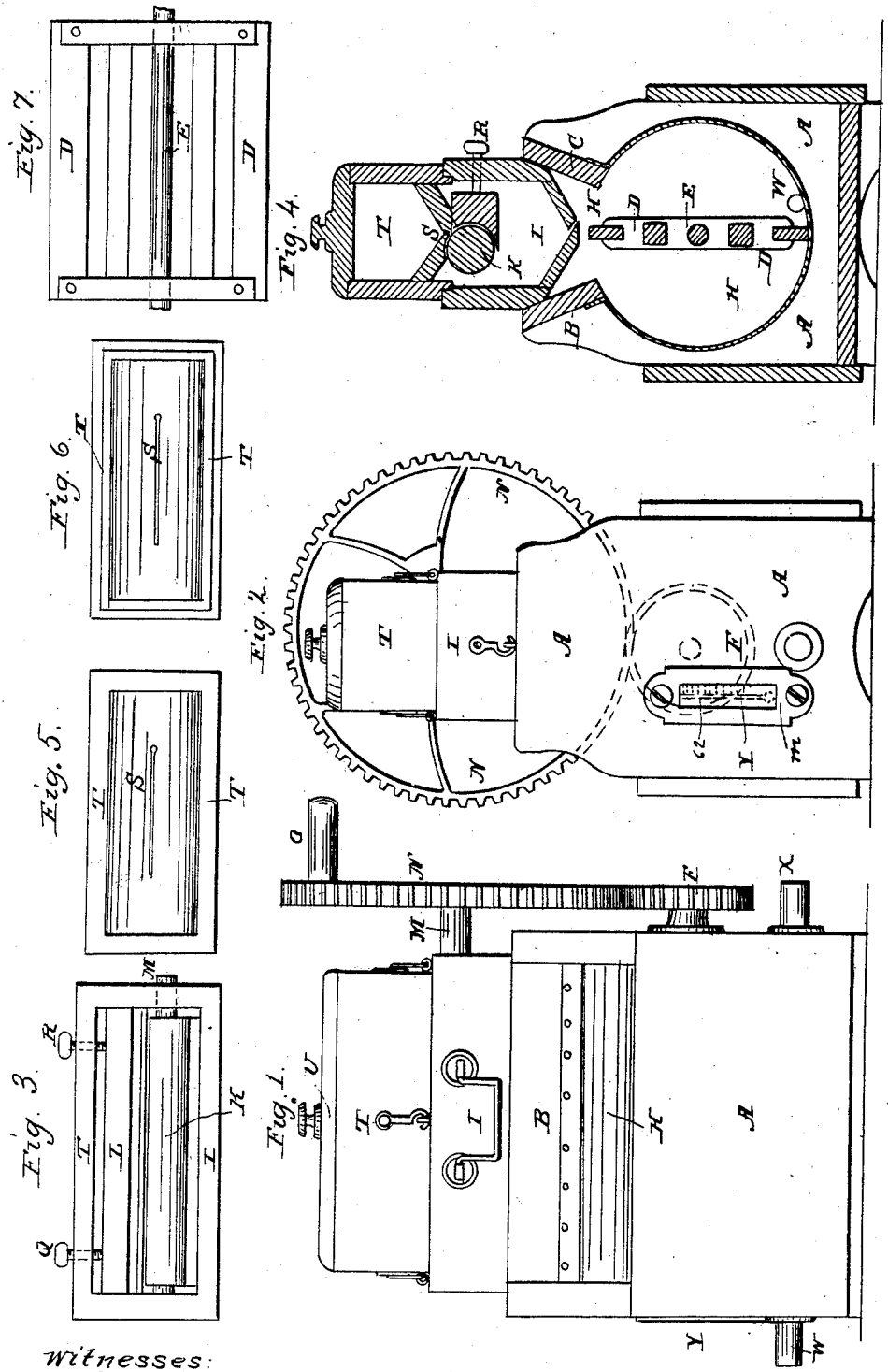

UNITED STATES PATENT OFFICE.

REUBEN G. HOLMES, OF WORCESTER, MASSACHUSETTS.

CHURN.

Specification of Letters Patent No. 28,177, dated May 8, 1860.

*To all whom it may concern:*

Be it known that I, REUBEN G. HOLMES, of the city and county of Worcester and State of Massachusetts, have invented an Improved Churn; and I do hereby declare that the same is fully described and represented in the following specification and the accompanying drawings, of which—

Figure 1, denotes a side elevation of the said churn; Fig. 2, an end elevation; Fig. 3, is a top view of the secondary case, and the roller and concave arranged therein. Fig. 4, is a vertical section of the same. Fig. 5, is a top view of the trough or milk receiver. Fig. 6, is a bottom view thereof. Fig. 7, is a top view of the dasher.

In the drawings, A, represents the main frame of the churn, the same being of a rectangular or any other proper form, and having a cylindrical reservoir, H, which is made open at its top, and has its sides formed of metal, and attached at their top surfaces to the longitudinal bars, B, C, as seen in the drawings. Within the said reservoir, a dasher, D, is disposed, the same being affixed to a horizontal shaft E, which has one of its journals supported in a suitable bearing, disposed on the inside of the churn, while its other end extends through the end of the reservoir and carries a gear wheel, F, as seen in Fig. 2. Furthermore, a thermometer Y, is placed within a rectangular slot or chamber, $m$, formed in one end of the main frame, as seen in the drawings, said thermometer having its rear surface in contact with the inner surface of the reservoir, H, the same serving to show the temperature of the milk. On the top of the said reservoir H, another rectangular box or case, I, is placed, the same serving as a cover to the said reservoir. Within this case, I, the cylinder, K, and concave, L, are disposed as seen in Fig. 3. The said cylinder is supported upon a shaft, M, one end of which, is supported in a suitable bearing in the inner end of the said case, I, while its other end extends through the opposite end of the said case, and carries upon its outer end, a driving pinion, N, the same having a handle, O, attached to its side in manner as seen in the drawings. The said pinion N, engages with the gear, F, and when put in revolution not only causes the cylinder, K, to revolve, but also by means of the gear, F, the dasher, D, to be rotated. The bar or concave, L, is formed concave upon one of its sides or that which is to be placed in close proximity to the cylinder, the said bar being disposed in a slot formed in the ends of the inner surfaces of the case, as seen in Fig. 3, and furthermore the said concave is regulated as to its distance from the cylinder by means of two thumb screws, Q, R, arranged as seen in the drawings. On the top of the case or box, I, a trough or milk receiver, T, is disposed, the same being provided with a removable top, U, and having an angular, or V-shaped bottom, through which and longitudinally thereof, a long narrow slot or passage, S, is made, such serving to convey the milk or allow it to fall in a line between the roller and concave.

A machine constructed in the above described manner, possesses many advantages. In the first place, the butter can be made with it in three or four minutes, thus saving more than one-half of the manual labor required by other machines. In the second place, the milk may be treated or churned directly after being taken from the cow, or as soon as it becomes cool. In the third place the milk so treated, not only retains its sweetness, but the butter so produced is much sweeter than that made in the ordinary way. In the fourth place, the machine is very simple in construction, and very little liable to derangement.

In operating with this machine, the cylinder or roller K is put in revolution by means of power applied to the handle of the driving pinion N. Such pinion engaging with the gear, F, puts its shaft and consequently the dasher in revolution. The milk is next to be poured into the receiver T; and through the aperture or slot formed in its bottom, the milk will fall into the angle between the cylinder and concave; and in passing between the same, the globules of cream will be crushed, spread or flattened or torn apart and caused to fall into the reservoir, H, when by being acted on by the dasher, they will readily be collected in a mass or into masses; the butter thus being separated from the milk, the milk may be withdrawn by means of the apertures, W, X, formed in the ends of the reservoir and the main frame, A, as seen in the drawings. The butter may next be taken from the reservoir H by removing the box or case, I, therefrom.

I do not claim a churn composed of one chamber, a dasher and two or more squeeze rollers arranged transversely in the chamber and over the dasher each of such rollers being made to revolve at a like degree of velocity whereby the cream when passed between any two of them will merely have its globules flattened or crushed the same being as shown in the United States Patent numbered 21,001; nor do I claim a cylindrical concave operating with a reservoir so as to crush and tear asunder the globules of cream that may be in or passing out of such reservoir; nor do I claim a revolving dasher, operating against a concave and in a reservoir containing such dasher and concave whereby the dasher is made to perform the functions of crushing and tearing asunder the globules and churning; nor do I claim a revolving dasher and disk combined with a single reservoir and a projecting rim placed around the outer surface of such reservoir, the same being as shown in the United States Patent numbered 23,968.

In my churn I place the dasher and the revolving cylinder and its concave in separate chambers, H, I, the upper one being provided with a small aperture or long slot through which the cream after being acted upon by the cylinder and concave is suffered to fall upon the dasher. There is an advantage in this, because the cream, after having been acted on by the cylinder and concave is retained in the chamber, L, for some time before it passes upon the dasher, and thus has time to properly remix and cool, and is subjected to the action of the dasher in a thin sheet whereby the churning of it is greatly promoted. Furthermore, by having the cylinder and concave separate from the dasher as described, the cylinder can be revolved at a different velocity from that of the dasher, either greater or less and thus the cream can be acted on to better advantage than when the dasher and cylinder or equivalent therefor are so combined as to revolve at the same speed.

I claim—

My improved churn having its several parts constructed and arranged in relation to each other and so as to operate together substantially as shown and described.

REUBEN G. HOLMES.

Witnesses:
R. H. EDDY,
F. P. HALE, Jr.